US 12,487,159 B2

(12) United States Patent
Hausotte et al.

(10) Patent No.: US 12,487,159 B2
(45) Date of Patent: Dec. 2, 2025

(54) MEASURING SYSTEM AND METHOD FOR HARDNESS MEASUREMENT

(71) Applicant: Friedrich-Alexander-Universitat Erlangen-Nürnberg, Erlangen (DE)

(72) Inventors: Tino Hausotte, Erlangen (DE); Sebastian Metzner, Nuremberg (DE); Julien Schinn, Erlangen (DE); Marion Merklein, Nuremberg (DE)

(73) Assignee: Friedrich-Alexander-Universitat Erlangen-Nürnberg, Erlangen (DE)

( * ) Notice: Subject to any disclaimer, the term of this patent is extended or adjusted under 35 U.S.C. 154(b) by 509 days.

(21) Appl. No.: 18/155,622

(22) Filed: Jan. 17, 2023

(65) Prior Publication Data
US 2023/0228659 A1  Jul. 20, 2023

(30) Foreign Application Priority Data
Jan. 17, 2022 (DE) .......................... 102022200458.2

(51) Int. Cl.
*G01N 3/42* (2006.01)
*G01N 3/40* (2006.01)
*G01N 3/62* (2006.01)

(52) U.S. Cl.
CPC ................ *G01N 3/42* (2013.01); *G01N 3/62* (2013.01)

(58) Field of Classification Search
CPC .. G01N 3/62; G01N 3/42; G01N 3/40; G01N 21/33; G01N 3/48; G01N 3/18;
(Continued)

(56) References Cited

U.S. PATENT DOCUMENTS

| 2007/0157710 | A1* | 7/2007 | Isomoto | G01N 3/42 |
| | | | | 73/81 |
| 2020/0110013 | A1* | 4/2020 | Kawazoe | G01N 3/42 |
| 2021/0156777 | A1* | 5/2021 | Shinza | G01N 3/02 |

FOREIGN PATENT DOCUMENTS

| DE | 19904448 A1 | 8/2000 |
| DE | 102015104696 B3 | 9/2016 |

(Continued)

OTHER PUBLICATIONS

German Patent Office Examination Report for Application No. 102022200458.2 dated Sep. 16, 2022 (8 pages Including statement of relevance).
(Continued)

*Primary Examiner* — Brandi N Hopkins
(74) *Attorney, Agent, or Firm* — Michael Best & Friedrich LLP (57) ABSTRACT

A measuring system comprises a stand having a base plate and a vertical column fastened thereto, a stand carriage that is movable along the vertical column and having a counter bearing for placing the object, a runner that is fastened to the stand carriage and is movable relative thereto in a guided manner and has an indenter for penetrating the object, having at least one force generation actuator, at least one motion generation actuator, wherein the indenter is coupled to the stand carriage via the actuators. The measuring system further comprises a metrology frame which is fastened to the counter bearing and is supported laterally on the vertical column, a displacement measuring unit for measuring a displacement of the stand carriage and/or the runner with the indenter. The measuring system comprises a force measuring circuit and a displacement measuring circuit both being are largely configured separately from one another.

29 Claims, 2 Drawing Sheets

(58) Field of Classification Search
CPC ... G01N 3/46; G01N 3/02; G01N 3/44; G01L
3/12; G03F 7/70716; G03F 7/70758;
G03F 7/70766; G03F 7/70258; G01B
5/008; G01B 21/04; G01B 21/045; G01B
11/005; G01B 11/26; G01B 21/042;
G01B 5/28; G02B 7/004; B81C 99/0045
See application file for complete search history.

(56) References Cited

FOREIGN PATENT DOCUMENTS

| | | |
|---|---|---|
| DE | 102015008326 A1 | 1/2017 |
| DE | 102016010668 B3 | 6/2017 |
| EP | 3591352 A1 | 1/2020 |
| JP | 3899437 B2 | 3/2007 |

OTHER PUBLICATIONS

Cuttino et al., "Three Dimensional metrology frame for precision applications", Precision Engineering, 1999, vol. 23, pp. 103-112.
Manske et al., "Recent developments and challenges of nanopositioning and nanomeasuring technology", Measurement and Science Technology, 2012, vol. 23, No. 7, pp. ?
International Standard, ISO-6508-2, "Metallic materials—Rockwell hardness test—Part 2: Verification and calibration of testing machines and indenters", 2015, 30 pages.
VDI Guideline, "Hardness testing of metallic materials", Handbook of production technology and manufacturing processes, Aug. 2012, 69 pages.

\* cited by examiner

Fig. 3

MEASURING SYSTEM AND METHOD FOR HARDNESS MEASUREMENT

CROSS-REFERENCES TO RELATED APPLICATIONS

This application claims the priority of German Patent Application, Serial No. DE 10 2022 200 458.2, filed Jan. 17, 2022, the content of which is incorporated herein by reference in its entirety as if fully set forth herein.

FIELD OF THE INVENTION

The invention relates to a measuring system and a method for primary and instrumented hardness measurement of an object. The measurement of hardness as a characterization variable of materials is used to determine the resistance of a body to another harder test object.

BACKGROUND OF THE INVENTION

Methods for measuring hardness are known from the state of the art. The guideline VDI/VDE 2616 Sheet 1:2012-08 lists ways of determining a characteristic value for the hardness of a material. A comparability between the individual hardness values from different methods is difficult due to the partly very different measuring principles and measuring methods.

Primary measurement methods are always at the upper end of the metrological traceability chain for a measured variable. The basis of this chain for hardness measurement are the primary hardness standard measuring devices of the national metrology institutes (NMI, for Germany: Physikalisch-Technische Bundesanstalt (PTB)=Federal Physical-Technical Institute) as well as the hardness reference standard measuring devices of calibration authorities and calibration laboratories.

The traceability of a hardness measuring device can be carried out directly via the traceability of the integrated measuring systems of the hardness measuring device and/or indirectly via hardness reference blocks. For direct traceability of the hardness measurement, for example, the calibration and verification of the test force by means of force gauges with relative uncertainties <0.05% or the use of calibrated mass comparators is suggested for the Rockwell hardness measurement according to DIN EN ISO 6508-2: 2015-06. For the calibration and verification of an indentation depth measuring system, the use of calibrated gauge blocks with uncertainties of <0.3 μm is specified.

For indirect traceability, primary hardness reference blocks for calibration laboratories are calibrated by the national metrology institutes. The uncertainty of these calibrations is essentially defined by the uncertainty of the direct calibration of the measuring systems of the primary hardness standard measuring devices as well as the international measurement comparisons. The calibration laboratories can use the primary hardness reference blocks to trace their hardness reference standard measuring devices and calibrate and provide hardness reference blocks for users. These hardness reference blocks are in turn used by users to trace their hardness measuring instruments. Due to the high measuring precision and the mostly additional direct traceability of the integrated measuring systems, better device measuring uncertainties and better measuring precisions are usually achieved in the hardness measurement with the reference standard measuring devices and hardness measuring devices compared to the calibration uncertainty of the primary hardness reference blocks. The repeatability and reproducibility of the hardness testing machines is often much better than the uncertainties of the indirect traceability via hardness reference blocks. These hardness reference blocks have a relative uncertainty of the hardness test value of up to 0.9%. Since it is required that the uncertainty of measurement in a hardness measurement must include the amount to the uncertainty of measurement from the calibration uncertainty of the certified value of the certified reference material, the uncertainty of the hardness measurement is currently defined by the worse indirect traceability.

EP 3 591 352 A1 discloses Planck balances for the shorter traceability of industrial weighing, which use the Kibble balance principle for a primary measurement of mass. DE 10 2015 104 696 B3 describes an electrodynamic levitation device for simultaneous measurement of forces and torques. The devices presented there are aimed either at using the system as a balance or for calibrating multi-axis force and torque measuring devices. Based on this, DE 10 2016 010 668 B3 describes the extension of this electrodynamic levitation device by the Kibble balance principle.

DE 10 2015 008 326 B4 describes the application of the measuring force for hardness measurement via electromagnetic coils. However, in comparison to the present invention, the traceability of the force-voltage characteristic is carried out via a conventional weighing system. The Lorentz force is transmitted via a holding device to the indenter, which is guided with a parallel guide rod system as in the electromagnetic force compensation (EMF) balances. The deflection measurement is carried out incrementally with a grid scale, wherein the latter is aligned with the distance to be measured in accordance with the Abbe principle.

SUMMARY OF THE INVENTION

It is an object of the invention to improve the hardness measurement of an object, wherein in particular a hardness measurement with indirect calibration and traceability by means of hardness reference blocks and a primary, instrumented hardness measurement with a direct traceability, in particular by means of a primary force measurement and/or a primary displacement measurement, are made possible.

This object is achieved by a measuring system for primary and instrumented hardness measurement of an object, wherein the measuring system comprises a stand having a base plate and a vertical column fastened thereto, a stand carriage that is movable along the vertical column, a counter bearing for placing the object, a runner that is fastened to the stand carriage and displaceable relative thereto in a guided manner, said runner having an indenter to penetrate the object, at least one force generation actuator, at least one motion generation actuator, wherein the indenter is coupled to the stand carriage via the actuators, wherein the indenter, the at least one force generation actuator, the stand carriage, the base plate, the vertical column, the counter bearing and the object define a force measuring circuit, a metrology frame which rests on the base plate and is supported laterally on the vertical column, a displacement measuring unit for measuring a displacement of the stand carriage and/or of the runner with the indenter, wherein the metrology frame, the displacement measuring unit, the runner, the indenter, the object and the counter bearing define a displacement measuring circuit, wherein the force measuring circuit and the displacement measuring circuit are configured separately from one another and by a method for primary and instrumented hardness measurement of an object using a measuring system, comprising the steps of: in a velocity mode, measuring an induced voltage $U_{VM}$ of the at least one force generation actuator moved at a defined velocity $v_{VM}$, in a weighing mode, measuring a coil current $I_{FM}$ that is required for a Lorentz force $F_{L,FM}$ generated in one of the actuators to compensate for a weight force portion of the runner depending on an angle of inclination, in a hardness measurement mode, penetration of the indenter into the object with a linear movement of the runner until the selected maximum measuring force $F_{M,HM}$ according to $F_{M,HM}=U_{VM}/v_{VM} \cdot (I_{FM}-I_{M,HM})$ or maximum penetration distance $s_{M,HM}$ is reached and thus a primary test force measurement according to the Kibble balance principle takes place.

The essence of the invention is that the Lorentz force $F_L$ is used for the hardness measurement method. By means of at least one actuator for force generation and in particular for implicit force measurement as well as by means of at least one actuator for motion generation, a traceability of the force measurement is made possible, in particular by means of the Kibble balance principle.

The method uses a force mode (FM) regularly or after a change in position to determine the weight force $F_G$ and, in the case of an orientation inclined to the vertical, a downhill slope force $F_H$ of the runner by controlling the weight force or downhill slope force to a fixed position with a Lorentz force $F_{L,FM}$ compensating for the weight force or downhill slope force. The magnitude of the Lorentz force $F_{L,FM}$ can be determined according to equation (1) for the equilibrium of forces with knowledge of the cross product of the conductor length l and magnetic flux density B or the actuator parameter l×B from the compensating coil current $I_{FM}$.

$$\vec{F}_{L,FM} = \vec{F}_G = m \cdot \vec{g} = I_{FM} \cdot (\vec{l} \times \vec{B}) \qquad (1)$$

In order to determine the cross product of the conductor length l and the magnetic flux density B or the actuator parameter l×B from equation (1), the voltage $U_{VM}$ induced in the same coil is additionally measured in a velocity mode (VM) during a movement with a known velocity $v_{VM}$, which voltage $U_{VM}$ depends on the same cross product of the conductor length l and the magnetic flux density B as well as the velocity $v_{VM}$ according to equation (2) for the induction of movement.

$$U_{VM} = (\vec{l} \times \vec{B}) \cdot \vec{v}_{VM} \qquad (2)$$

For the hardness measurement, the penetration body is then moved linearly in the actuator direction in the hardness measurement (HM) mode until the maximum measuring force is applied.

The measuring system comprises at least one actuator for generating the Lorentz force for the weighing mode and the hardness measurement as well as at least one actuator for generating the movement in the velocity mode.

The actuators can be designed as plunger coil actuators or as electromagnetic linear motors.

The actuators are used in the velocity mode either to generate the necessary linear motion trajectory or calibrated by measuring the induced voltage $U_{VM}$ and the velocity $v_{VM}$m of the coil relative to the magnetic field. The actuators can change their function in order to determine the actuator parameters l×B from all actuators.

The coil of the at least one actuator for realising the compensation force in the weighing mode and the measuring force in hardness measurement and the coil of the at least one actuator for realising the movement in the velocity mode are components of a runner which further comprises a penetration body, a so-called indenter. The indenter serves to penetrate the object, in particular a measuring object. The object is either a hardness reference block or an object to be examined for the determination of hardness.

The known measuring equation (3) of the Kibble balance derived from the equations (1) and (2)

$$\vec{F}_{L,FM} \cdot \vec{v}_{VM} = \vec{F}_G \cdot \vec{v}_{VM} = m \cdot \vec{g} \cdot \vec{v}_{VM} = U_{VM} \cdot I_{FM} \qquad (3)$$

can be converted for vertical alignment for the determination of the weight force $F_G$ or the weight force compensating Lorentz force $F_{L,FM}$ and the compensating coil current $I_{FM}$ can be replaced by the voltage $U_{FM}$ measured via a series resistor R using Ohm's law.

$$\vec{F}_{L,FM} = \vec{F}_G = m \cdot \vec{g} = \frac{U_{VM}}{\vec{v}_{VM}} \cdot I_{FM} = \frac{U_{VM}}{\vec{v}_{VM}} \cdot \frac{U_{FM}}{R} \qquad (4)$$

For the calculation the measured values of the velocity $v_{VM}$ and tension $U_{VM}$ in the velocity mode as well as measured tension $U_{FM}$ in the weighing mode are required. Due to the described method, the intended primary instrumented hardness measurement only requires the determination of the weight force $F_G$ of the runner with vertical orientation according to equation (4) or, when used in an orientation of the measuring direction inclined with respect to the vertical with an inclination angle α to the vector of the weight force $F_G$, the downhill slope force $F_{H,FM}$ in the weighing mode as the product cos(a) and the weight force $F_G$ of the runner with the indenter according to equation (5).

$$\vec{F}_{L,FM} = \vec{F}_{H,FM} = \cos(\alpha) \cdot \vec{F}_G = \cos(\alpha) \cdot m \cdot \vec{g} = \frac{U_{VM}}{\vec{v}_{VM}} \cdot I_{FM} = \frac{U_{VM}}{\vec{v}_{VM}} \cdot \frac{U_{FM}}{R} \qquad (5)$$

According to the invention, it has been found that the local gravitational acceleration g therefore does not have to be known and that its determination does not provide an uncertainty contribution as in the case of balances or alternative hardness measurement methods with weights for applying force. One of the advantages of the invention is that it is no longer necessary to determine the local gravitational acceleration g at the measuring point. If the hardness measurement is carried out with the same orientation or position as for the determination of weight force $F_G$ or downhill slope force $F_{H,FM}$ in the weighing mode, the measuring system can be used in any direction. A levelling as with the balances is not necessary and the orientation does not contribute to the uncertainty of the test or measuring force $F_{M,HM}$ in the hardness measurement mode. Provided the measuring system is in the same position, the downhill slope force remains constant in the weighing mode and in the hardness measurement mode ($F_{H,FM}=F_{H,HM}$) and can be used to calculate the test or measuring force $F_{M,HM}$ according to equation (6).

$$\vec{F}_{M,HM} = \vec{F}_{H,HM} - \vec{F}_{L,HM} = \frac{U_{VM}}{\vec{v}_{VM}} \cdot (I_{FM} - I_{HM}) = \frac{U_{VM}}{\vec{v}_{VM}} \cdot \frac{U_{FM} - U_{HM}}{R} \qquad (6)$$

For the vertical arrangement of the device, the weight force $F_G$ of the runner must at least be able to be carried by the actuator for generating an upwardly directed Lorentz force $F_{L,FM}$ in order to bring the runner into a levitating state and lift the indenter off the sample. In the case of the hardness measurement, the measuring force $F_{M,HM}$ results from the difference between the weight force $F_G$ and a selectable Lorentz force $F_{L,HM}$. The measuring force can vary between zero and the total of the weight force $F_G$ and the amount of the maximum negative Lorentz force $F_{L,HM}$. In order to achieve a maximum measuring force $F_{M,HM}$, a vertical orientation of the runner movement axis is preferable.

In contrast to the parallel spring guides of the EMF balances or an arrangement according to DE 10 2015 008 326 B4, the use of air bearings for linear guidance of the runner allows frictionless, spring force-free, straight-line and robust guidance of the runner with the indenter.

The measuring system has a metrology frame that rests on the stand and is laterally supported by it. The metrology frame is in particular C-shaped and/or in particular made of materials that have a low coefficient of linear thermal expansion.

The measuring system has a displacement measuring unit which is used to measure a displacement of the runner with the indenter and/or of the stand carriage relative to the stand and/or relative to the counter bearing. The measurement of the displacement covered by the runner with the indenter and the position and trajectory control is carried out by means of a laser interferometer traced back via the laser light wavelength or alternatively with such directly or indirectly calibrated displacement measuring systems.

The metrology frame and the displacement measuring unit define a separate displacement measuring circuit. According to the invention, deviations of the displacement measurement due to deformations of an otherwise common displacement measuring circuit and force measuring circuit caused by the measuring force are avoided by a separate design of the displacement measuring circuit and force measuring circuit, which only run together at the counter bearing, the object and the indenter. In addition, this separation enables thermal insulation of the metrology frame to reduce its temperature fluctuations and the resulting length variations.

The displacement measuring system allows either separate or summed detection of the movement of the indenter caused by the Lorentz force as well as the vertical pre-positioning of the runner with the indenter by the stand carriage. The pre-positioning enables the measurement of objects of different thicknesses despite the limited usable positioning ranges of the actuators, which are also referred to as Lorentz actuators or actuators for short in the following.

The measuring axis of the displacement measuring system is aligned with the axis of the indenter to realise the Abbe principle and to avoid first order length measuring deviations.

Two deflection measuring systems, each consisting of a laser diode and a 2D position sensor, enable a visual, vertical pre-positioning of the runner to adapt to different thicknesses of the object with their laser beams crossing on the indenter axis and subsequently, with the four signals of the two 2D position sensors, an inclination alignment of the object surface to be examined to the indenter axis as well as an additional finer vertical pre-positioning of the stand carriage with the runner. The inclination alignment can be carried out with two additional, vertically arranged linear actuators, which are arranged in a triangle with the counter bearing. A measurable and/or adjustable alignment of the indenter to the object surface enables comparability between different hardness measurements. Additional, horizontally arranged linear actuators enable a lateral positioning of the object and thus a variable position of the location of the indention on the object.

The measuring system and method according to the invention enable primary, instrumented hardness measurement by means of indirect measurement exclusively with displacement and force measurement traced back to physical constants and SI base units. In particular, a primary laser interferometric displacement measurement and a primary force measurement according to the Kibble balance principle shorten the direct traceability and lead to more reliable measurement results. The use of hardness reference blocks known from the prior art as well as calibrated reference force measuring devices or mass pieces for direct calibration and/or traceability of the test force is thus dispensable.

The Lorentz actuator for force generation is also called a force generation actuator. The Lorentz actuator for motion generation is also referred to as the motion generation actuator. The force generation actuator and the motion generation actuator are designed in particular with the same function and in particular with the same construction. It is possible to use the motion generation actuator as a force generation actuator and vice versa.

The object whose hardness is measurable by means of the device is in particular part of the force measuring circuit and the displacement measuring circuit.

The force measuring circuit and the displacement measuring circuit are designed separately from each other, but can overlap in certain components, in particular the indenter, the object to be measured and the counter bearing. This means that the indenter, the counter bearing and the object to be measured are included in both the force measuring circuit and the displacement measuring circuit.

In particular, the runner has a carrier plate, in particular a multi-part and in particular two-part carrier plate, wherein in particular a centrally arranged, in particular thermally low-expansion carrier plate part of the carrier plate is part of the displacement measuring circuit and wherein in particular a second carrier plate part surrounding the centrally arranged carrier plate part is part of the force measuring circuit.

A measuring system comprising four actuators which are arranged diametrically opposite each other in pairs, in particular with respect to an indenter longitudinal axis ensures a resultant force action along the indenter axis. This reduces the occurrence of torques and tilting and improves the measuring accuracy. In particular, the actuators are arranged in pairs opposite each other with respect to the longitudinal axis of the indenter at the same distance therefrom. In particular, the actuators are arranged symmetrically to the longitudinal axis of the indenter.

The number of connecting wires required for the Lorentz actuators is reduced, in particular halved, by connecting the respective opposing actuators in series. In this manner, undesired interference, in particular undesired spring forces caused by the connecting wires, can be reduced.

The four actuators of the measuring system can in particular be used flexibly. In the velocity mode, two actuators are used as motion generation actuators for calibrating the other two force generation actuators. Two or four actuators are used as force generation actuators in a weighing mode and as force generation and motion generation actuators in the hardness measurement.

An embodiment of the measuring system such that the actuators are fastened to a carrier plate of the runner, on said carrier plate in particular the indenter is held, allows the force measurement to be traced back to the Kibble balance principle. In particular, this reduces the uncertainty of the traceability and improves the measuring accuracy of the hardness measurements with this measuring system.

A carrier plate that is designed in two parts with a first, in particular centrally arranged, thermally low-expansion carrier plate part, to which in particular the indenter and a first measuring mirror are fastened, and a second carrier plate part which in particular surrounds the first carrier plate part, wherein the latter in particular connects the actuators to the indenter, enables a targeted, functional adaptation with regard to hardness measurement and measuring accuracy. A first carrier plate part, which is in particular associated with the displacement measurement and the displacement measuring circuit, is made of a material which has a low coefficient of linear thermal expansion and carries a measuring mirror of the interferometer. Such materials having a coefficient of linear thermal expansion of less than $\pm 2 \cdot 10^{-6}$ $K^{-1}$ under laboratory conditions are for example iron-nickel alloys, in particular consisting of 64% iron and 36% nickel. Iron-nickel alloys are marketed under the registered trade names Invar® or Super-Invar®. Materials with lower coefficients of linear thermal expansion also include quartz glass, in particular consisting of $SiO_2$, glass-ceramic materials marketed in particular under the registered trade names ZERODUR® and CLEARCERAM®, titanium silicate glass under the registered trade name ULE®, in particular consisting of SiO2-TiO2, and/or a low-expansion polycrystalline ceramic under the registered trade name NEXCERA®, in particular consisting of $2MgO-2Al_2O_3-5SiO_2$.

The carrier plate further has a second carrier plate part which is integrated into the force measuring circuit and is in particular made of a lightweight material which in particular has a high stiffness and a low mass. The material used for the second carrier plate part is in particular an aluminium alloy and/or carbon fibre composite material. In particular, the second carrier plate part is arranged surrounding the first carrier plate part. In particular, the two carrier plate parts are arranged concentrically to one another and in particular concentrically to the longitudinal axis of the indenter.

Due to the fact that the force measuring circuit and the displacement measuring circuit are separated from one another by the two carrier plate parts, the requirements on the second carrier plate part, in particular its extensional and/or bending stiffness, are reduced. Any deformations of the second carrier plate part caused by the test force are not included in the displacement measurement. The displacement measurement is decoupled from undesired deformations of the second carrier plate part and is therefore not falsified. The density of the second carrier plate part is in particular determined in such a way that the total mass of the runner is carried by the actuators. A reduction of the heat input is achieved by a minimal current flow to the actuators.

An embodiment of the measuring system such that the stand and the metrology frame are connected via a kinematic Kelvin coupling, wherein the position of the metrology frame relative to the stand is predetermined in particular by means of an abutment of the counter bearing and the metrology frame is supported on the stand, in particular laterally, in particular by means of two further abutments of the kinematic Kelvin coupling, ensures an advantageous decoupling of the force measuring circuit and the displacement measuring circuit. A Kelvin kinematic coupling is understood to be a kinematic coupling between two objects, wherein the objects are mutually supported at three bearing points. In Kelvin kinematic coupling, one component of the primary bearing point, here an abutment of the Kelvin kinematic coupling, has three orthogonal surfaces or three cylindrical surfaces. The other component, i.e. the counter bearing, has a spherical outer contour that rests in the other component with a defined position but can rotate. The two further bearing points of the kinematic Kelvin coupling on the stand support the metrology frame, in particular laterally, and block its rotation. The kinematic Kelvin coupling ensures a reliable, stable and essentially decoupled support and non-overdetermined fastening of the metrology frame to the stand and thus a defined connection to the force measuring circuit.

Due to the fact that the metrology frame is laterally supported on the stand, in particular on the vertical column, the rotation of the metrology frame is blocked.

An embodiment of the measuring system such that the displacement measuring unit is designed as a laser interferometer and in particular has a laser beam source, a collimator, a beam splitter, a first measuring mirror, a second measuring mirror and a laser interferometer evaluation unit, ensures a reliable and accurate displacement measurement.

A laser interferometer serves as the displacement measuring unit, which in particular has a laser beam source, a collimator, a beam splitter, two measuring mirrors and a laser interferometer evaluation unit. In particular, the first measuring mirror is arranged on the runner, i.e. it is designed to move with the runner and/or the stand carriage relative to the stand. The first measuring mirror is arranged on the carrier plate of the runner, in particular in the central region of the first carrier plate part. The second measuring mirror is of stationary design and is arranged in particular on the metrology frame. The measuring axis of the displacement measuring system is aligned with the axis of the indenter to implement the Abbe principle and to avoid first-order length measuring deviations. In particular, the measurement of the travelled displacement of the runner with the indenter and the position and trajectory control are carried out by means of the laser interferometer traced back via the laser light wavelength. The reference position for initialising the interferometer is determined for the movement of the runner and the stand carriage with at least one optical position sensor each in conjunction with a diaphragm having two openings. This enables a correct consideration of the dead distance of the interferometer during the length measurement value correction as well as the separate pre-positioning of the indenter with the stand carriage, wherein the permanently required position control of the runner is switched to the signal of the associated position sensor.

In principle, it is possible to use alternative length measuring systems such as optical linear encoders, in particular displacement measuring systems that have been calibrated directly or indirectly by means of a laser interferometer.

The embodiment of the measuring system comprising at least one air bearing for guided frictionless mounting of the indenter relative to the stand carriage with at least one linear air bearing enables friction-free, in particular friction force-free linear guidance of the runner. In order to avoid undesired rotations about the longitudinal axis of a rotationally symmetrical linear air bearing, a rotationally blocked linear air bearing is necessary. For this purpose, in particular two linear air bearings are used for the linear guidance of the runner and in particular of the indenter. The air bearing bushes of the linear guide are designed in particular with porous material as an air outlet and are in particular a component of the stand carriage. The outflow of compressed air and the compressed air supply tubes thus have no influence on the measuring force.

The embodiment of the measuring system such that the actuators each have a magnet arrangement fastened in particular to the stand carriage and a coil that is movable with respect thereto enables the primary measurement of the force and traceability of the force measurement according to the Kibble balance principle using the Lorentz force. The magnet arrangement may be fixed and the coil movable or the magnet arrangement may be movable and the coil fixed.

An embodiment of the measuring system such that at least one deflection measuring system for detecting the distance of the stand carriage to the object and/or for detecting the inclination of the object, wherein the at least one deflection measuring system comprises a laser diode and a position sensor, enables a visual and automated evaluation of the distance of the stand carriage to the object. The at least one deflection measuring system comprises at least one light beam, in particular a laser beam, which passes through an indentation point. If two deflection measuring systems are present, their light beams, in particular their laser beams, cross at the indentation point. The reflecting surfaces of the two beams that are visible on the surfaces of the object allow a visual assessment of the distance of the runner to the sample surface and overlap at the ideal distance and simultaneously mark the location of the hardness measurement on the object. The measuring signals of the 2D position sensors of the deflection measuring systems enable the automated distance adjustment of the stand carriage to the object and the alignment of the inclination of the object. With the distance adjustment it is achieved that the penetration body always reaches the object at almost the same position of the runner and the force-displacement characteristics of the Lorentz actuators are only used in a smaller range and thus the force measuring accuracy can be improved. By aligning the inclination of the object, the object surface is aligned to the indenter so that the surface normal of the object surface and the indenter longitudinal axis are parallel, thus reducing otherwise occurring deviations when the indenter is not applied vertically.

A measuring system comprising at least one positioning actuator for horizontal positioning and/or inclination alignment of the object on the counter bearing simplifies the lateral positioning of the object during the hardness measurement by a possible automatic displacement of the object in lateral direction parallel to the plane of the base plate of the stand and enables an automated alignment of the inclination of the object in particular in connection with the deflection measuring systems of claim 9. The lateral positioning allows the hardness to be measured in a plurality of zones of the object.

The embodiment of the measuring system comprising a control/regulation unit which is designed to operate the measuring system in various operating modes, in particular in a weighing mode, in a velocity mode and/or in a hardness measurement mode, in particular with controlled trajectory and test force, enables an automated execution of the hardness measurement and/or measuring force calibration in the weighing mode and the velocity mode. In particular, a position control and/or trajectory-controlled positioning of the runner with the indenter and in particular in real time is possible. Such a control/regulation unit, which is in signal connection, in particular bidirectional signal connection, in particular with the displacement measuring unit and the at least one deflection measuring system on the one hand and in particular with the actuators and the positioning actuator on the other hand, enables the hardness measurement and/or measuring force calibration to be carried out automatically.

The control/regulation unit is used to detect measuring signals, in particular of the displacement measuring unit, in particular of the laser interferometer, of reference position sensors, of environmental sensors, of deflection measuring systems as well as of actuator currents and actuator voltages. In particular, the control/regulation unit has an evaluation unit, in particular of integrated design, which is used to process the measuring signals and, in particular, outputs actuating signals to the actuators, in particular in order to specify force, position, velocity, trajectory and actuator currents.

A method according to the invention essentially has the advantages of the measuring system according to the invention, to which reference is hereby made. In particular, traceability of the force and displacement measurement enables a primary and instrumented hardness measurement and improves the accuracy of the hardness measurement of the object and reduces the measurement uncertainty.

If the measuring system is oriented with an inclination relative to the vertical, a corresponding downhill slope force $F_{H,FM}$ is determined instead of the weight force oriented vertically downwards, which is in particular dependent on the angle of inclination measured relative to the vertical. The method according to the invention functions independently of the angle of inclination of the measuring system with respect to the vertical.

Optionally, the method can be used to determine the value of the Lorentz force $F_{L,FM}$ which compensates for the weight force portion of the runner. Equation (4), which is derived from the measuring equation (3) of the Kibble balance, serves for this purpose in particular.

A method in which, during the velocity mode, a measurement of the calibration distance $s_{VM}$ and/or during the penetration of the indenter, a measurement of the penetration distance $s_{M,HM}$ takes place and wherein the velocities $v_{VM}$ or $v_{M,HM}$ are determined from a distance $s_{VM}$ or $s_{M,HM}$ determined by means of the displacement measuring unit and a traced back time standard t according to $v_{VM}=ds_{VM}/dt$ or $v_{M,HM}=ds_{M,HM}/dt$, wherein in particular a primary displacement measurement is carried out with an interferometer and/or a traceability of the displacement measurement is carried out via a primary displacement measurement, enables the hardness measurement and/or measuring force calibration to be carried out easily and automatically and thus enables traceability of the hardness measurement.

A method comprising automatic switching between the weighing mode, the velocity mode and the hardness measurement mode enables the hardness measurement and/or measuring force calibration to be carried out easily and automatically, as well as the traceability of the displacement and velocity measurement.

A method comprising an automatic pre-positioning of the stand carriage and/or parallel alignment of the surface normals of the object at the indentation point to the indenter longitudinal axis by the at least one deflection measuring system and/or the at least one positioning actuator in connection with the counter bearing enables an unsophisticated and automatic pre-positioning of the stand carriage and/or parallel alignment of surface normal of the object at the indentation point to the indenter longitudinal axis. This reduces measurement deviations in the hardness measurement by using the at least one actuator in alternating characteristic ranges and/or a force not applied perpendicularly to the surface or at an unknown angle to the surface.

Both the features indicated above and the features indicated in the embodiment example of a measuring system according to the invention are each suitable, either on their own or in combination with each other, for further developing the subject matter according to the invention. The respective combinations of features do not constitute a restriction with regard to the further development of the subject matter of the invention, but are essentially merely exemplary in character.

Further features, advantages and details of the invention will be apparent from the following description of an embodiment example based on the drawing.

DESCRIPTION OF THE PREFERRED EMBODIMENT

Figure 1:
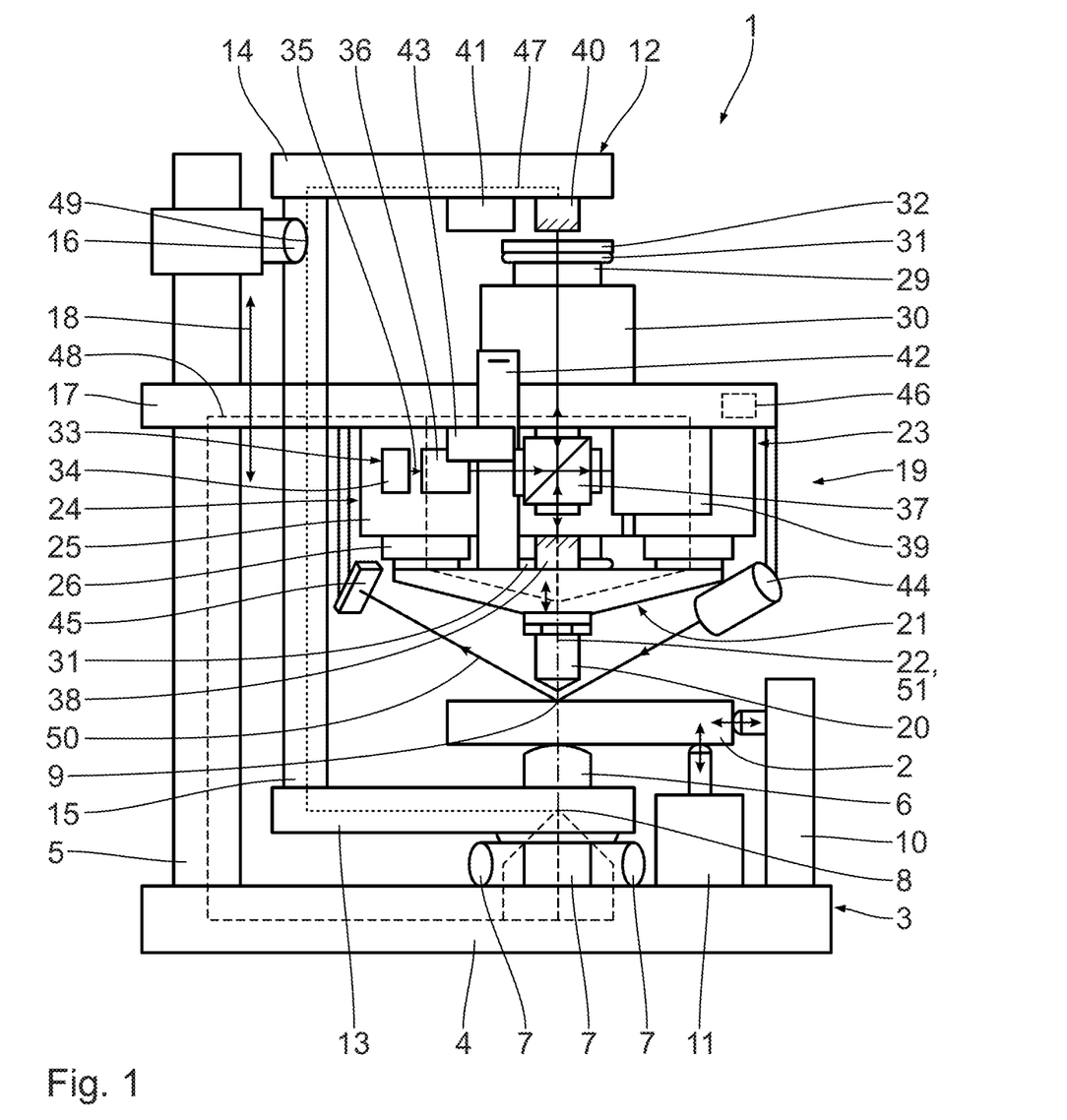
FIG. 1 shows a schematic side view of a measuring system according to the invention.
Figure 2:
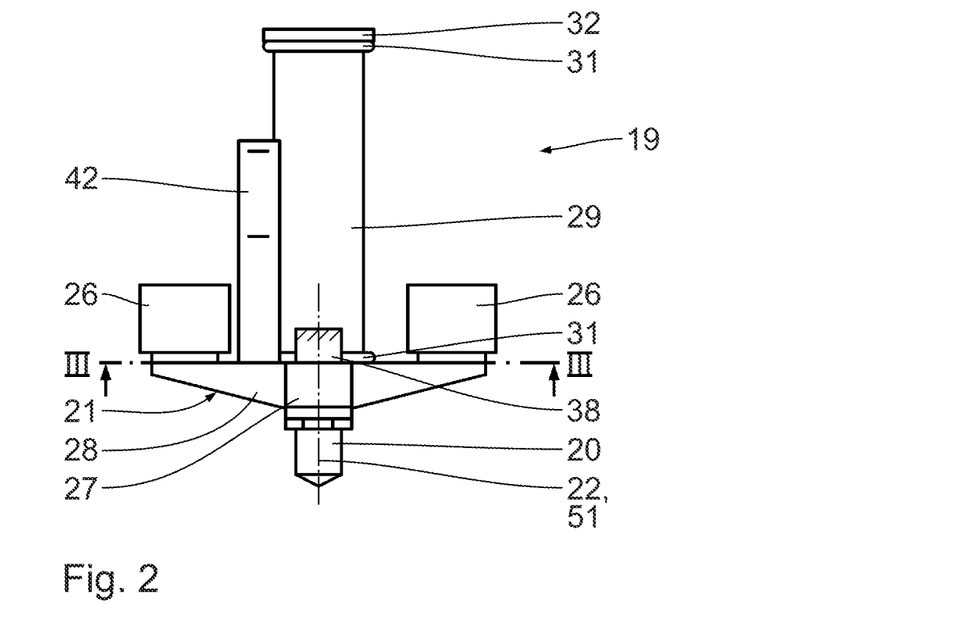
FIG. 2 shows an enlarged detail view of a runner of the measuring system in FIG. 1.
Figure 3:
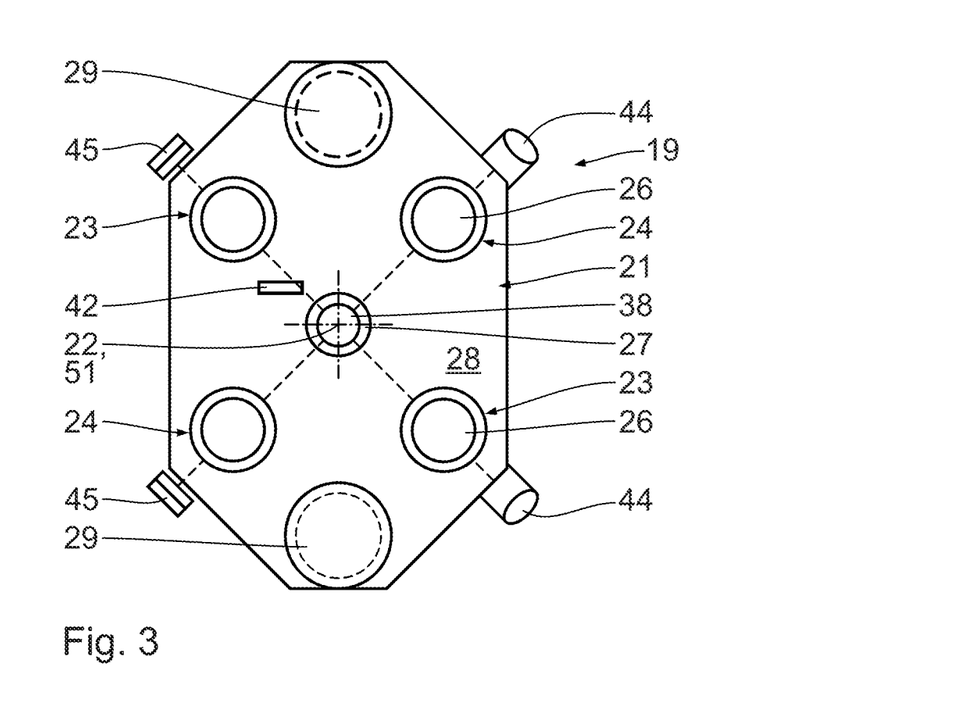
FIG. 3 shows a sectional illustration according to section line in FIG. 2.

A measuring system identified as 1 in FIGS. 1 to 3 serves for the primary and instrumented hardness measurement of an object 2.

The measuring system 1 comprises a stand 3 having a base plate 4 and a vertical column 5 fastened to the base plate 4. In particular, the stand 3 is height-adjustable and/or levellable in order, on the one hand, to enable an adaptation to different object thicknesses and, on the other hand, to simplify a horizontal alignment of the stand 3, in particular of the base plate 4. The vertical column 5 is oriented perpendicularly with respect to the base plate 4. If the base plate 4 is oriented horizontally, as shown in FIG. 1, the vertical column 5 is oriented vertically. If the base plate 4 is oriented at an angle of inclination to the horizontal, the vertical column 5 is oriented at the same angle of inclination to the vertical.

A counter bearing 6 is arranged on the base plate 4. The counter bearing 6 rests on the base plate 4 by means of a primary abutment 7 of a kinematic Kelvin coupling in a thus defined spherical centre position, the spherical centre position forming a so-called bearing point 8. In the bearing point 8, the counter bearing 6 is blocked in the three translational degrees of freedom. The primary abutment 7 of the kinematic Kelvin coupling preferably consists of three cylindrical pins whose cylinder axes are arranged in a common plane oriented perpendicular to a vertical axis 51 and the cylinder axes are located at an angle of 120° to one another and additionally form a triangle. The counter bearing 6 contacts each of the three cylindrical pins of the primary abutment 7 with a point contact. Sliding at the three points of contact and a resulting rotation of the counter bearing 6 is not blocked and allows a metrology frame 12 to rest laterally against the two further abutments 16 of the kinematic Kelvin coupling on the vertical column 5. The metrology frame 12 is rigidly connected to the counter bearing 6. The object 2 is arranged on the counter bearing 6 for the hardness measurement. According to the embodiment example shown, the counter bearing 6 is designed to be partially spherical and/or has at least one further spherically shaped, convex surface which serves as a contact surface for placing the object 2. There is point contact between the object 2 and the counter bearing 6. Friction losses during relative movements between the object 2 and the counter bearing 6 are thus minimised. The spherically shaped, convex surface of the counter bearing 6 ensures that there is still point contact when the inclination of the object 2 changes. By means of two vertically arranged positioning actuators 11 and the counter bearing 6 in a triangular arrangement, a non-overdetermined support of the object 2 with a defined adjustable inclination is possible. The centre of the spherically shaped, convex surface of the counter bearing 6 is preferably located on an indenter longitudinal axis 22, so that in the case of plane-parallel objects as the object 2, the point contact is exactly opposite the indentation point and there is a straight, non-offset force curve in the force measuring circuit 48. The counter bearing 6 can also have a differently shaped surface, in particular the counter bearing 6 can be cylindrical or have a polygonal outer contour.

The object 2 can be positioned by means of one or more horizontally arranged positioning actuators 10 and/or tilted by means of one or two vertically arranged positioning actuators 11. The positioning actuators 10, 11 are in particular linear actuators. The positioning actuators 10, 11 rest directly against the object 2. The positioning actuators 10, 11 are in particular designed as piezo actuators. It is also possible that a plurality of positioning actuators 10, 11 are provided, which are arranged in particular in a direction perpendicular to the drawing plane according to FIG. 1 one behind the other and/or next to each other. It is advantageous if, in addition to the positioning actuators 10, the object 2 is guided by at least one linear guide element which is not shown separately in FIG. 1. With the linear guide element or a second positioning actuator 10 arranged next to each other, the rotation of the object 2 about the vertical axis is prevented or adjustable. It is further advantageous if the bearing of the object 2 has an additional positioning actuator 10 with a direction of action perpendicular to the drawing plane, which is not shown separately in FIG. 1, in order to position the object 2 in this direction as well.

The measuring system 1 further includes the metrology frame 12, which is designed to be inherently stiff. The metrology frame 12 has a lower, in particular plate-shaped base 13 and a holding plate 14 oriented parallel thereto and arranged at a distance from the base 13, and in particular of plate-shaped design. The base 13 and the holding plate 14 are firmly connected to each other by means of one or more supports 15. The support 15 is oriented perpendicular to the base 13 and the holding plate 14, respectively. In particular, the support 15 is oriented parallel to the vertical column 5. The metrology frame 12 is substantially C-shaped and/or made of materials having a low coefficient of linear thermal expansion. The metrology frame 12 rests against the vertical column 5 of the stand with the two further abutments 16 of the kinematic Kelvin coupling, which are arranged fixedly and in particular immovably in a direction perpendicular to the drawing plane according to FIG. 1 at a distance behind one another and/or next to one another as well as far away from the primary abutment 7, whereby the rotation of the metrology frame 12 is blocked. The contact force is generated by the centre of gravity of the metrology frame 12 being offset from the counter bearing 6 to the vertical column 5. The secondary support of the two further abutments 16 of the kinematic Kelvin coupling preferably consists of two cylindrical pins, wherein the cylinder axes lie in a common horizontal plane and the cylinder axes preferably are positioned at an angle of 90° to each other. The angle bisector between the two cylinder axes is aligned parallel to the drawing plane according to FIG. 1. The metrology frame 12 with one of its preferably cylindrical supports 15 contacts each of the two cylindrical pins of the secondary abutment 16 with a point contact. A sliding at the two points of contact is not blocked and allows a compensation of different length variations of the stand 3 and the metrology frame 12 due to acting forces and moments and/or temperature changes. The secondary abutment 16 blocks two rotations together with the primary abutment 7. The remaining freedom of rotation around the connecting line of the bearing point 49 of the secondary abutment 16 with the bearing point 8 of the primary abutment 7 is blocked by the second abutment 16 (=tertiary abutment). The tertiary abutment of the two further abutments 16 of the kinematic Kelvin coupling preferably consists of a cylindrical pin, wherein the cylinder axis lies in a horizontal plane and in particular runs in a direction perpendicular to the drawing plane according to FIG. 1. The metrology frame 12 contacts the cylindrical pin of the tertiary abutment 16 with another of its preferably cylindrical supports 15 with a point contact. Sliding at the point of contact is not blocked and allows compensation for different variations in length and width of the stand 3 and the metrology frame 12 due to acting forces and moments and/or temperature changes.

The metrology frame 12 is of static design. The kinematic Kelvin coupling, consisting of the abutments 7 and abutments 16 as well as the counter bearing 6 and the supports 15, guarantees a lateral distance between the stand 3 and the metrology frame 12, in particular between the vertical column 5 and the support 15. This lateral distance remains almost constant during a hardness measurement despite measuring force-related and temperature-related and varying deformations and expansions of the stand 3. The separation of the displacement measuring circuit 47 and the force measuring circuit 48 also enables a partial thermal insulation of the metrology frame 12 in order to reduce its temperature fluctuations and the resulting variations in length.

The metrology frame 12 is rigidly screwed to the counter bearing 6, in particular with the base 13.

For this purpose, the counter bearing 6 has a horizontal, annular contact surface to which the base 13 of the metrology frame 12 is attached. The horizontal, annular contact surface provides a defined connection of the force and displacement measuring circuit on the underside of the base 13 of the metrology frame 12 in the direction of displacement measurement. The metrology frame 12 is thus arranged distinctly and in a positionally stable manner.

A stand carriage 17 is arranged on the stand 3, in particular along the vertical column 5, so as to be movable, i.e. height-adjustable, along a height direction 18. The stand carriage 17 is arranged along the height direction 18 between the base 13 and the holding plate 14 of the metrology frame 12 and is oriented in particular parallel to the base 13 and the holding plate 14 in each case. The height direction 18 is oriented parallel to the longitudinal axis of the vertical column 5. The height direction 18 is oriented perpendicular to the plane of the stand 3.

The stand carriage 17 is essentially plate-shaped and carries a runner designated 19 in its entirety. The runner 19 has a penetration body, also referred to as an indenter 20, which is used to penetrate the object 2. The indenter 20 is attached to a carrier plate 21, in particular the underside thereof. The indenter 20 has an indenter longitudinal axis 22 which is oriented in particular parallel to the height direction 18 and in particular perpendicular to the plane of the stand 3.

The indenter 20 is coupled, in particular fastened, to the stand carriage 17 via the carrier plate 21 as well as via coils 26 of the actuators 23, 24 that are attached to the carrier plate 21 and two precision shafts 29 of the linear air bearings 29, 30. According to the embodiment example shown, two first Lorentz actuators are provided, which are used as an actuator 23 for force generation in the weighing mode and for force and motion generation in the hardness measurement. Furthermore, two second Lorentz actuators are provided, which are used as an actuator 24 for motion generation in the velocity mode. Interchanging the Lorentz actuators 23 and 24 for use respectively as actuators for force generation and/or motion generation is possible and intended. The first and second Lorentz actuators 23, 24 are in particular identical in design. The first Lorentz actuators 23 and the second Lorentz actuators 24 are arranged in a plane perpendicular to the indenter longitudinal axis 22 in each case diametrically opposite to each other with respect to the indenter longitudinal axis 22, as shown in particular in FIG. 3. The first and second Lorentz actuators 23, 24 each have a magnet arrangement 25 which is attached in particular to the stand carriage 17. The Lorentz actuators 23, 24 each further have a coil 26 which is displaceable relative to the magnet arrangement 25 and which is fastened in particular to the carrier plate 21.

The carrier plate 21 is made in two parts and comprises a first carrier plate part 27, which is designed centrally, in particular coaxially to the indenter longitudinal axis 22 and circular disc-shaped or cylindrical. The first carrier plate part 27 is made of a material having a low coefficient of thermal linear expansion, in particular Invar® and/or quartz glass, in order to minimise the variation in length with temperature change, in particular from the heating of the coils when they are energised, and the effects on the displacement measuring circuit. The first carrier plate part 27 is surrounded by a second carrier plate part 28. The second carrier plate part 28 is in particular annular disc-shaped. The second carrier plate part 28 is made of a lightweight material, in particular with high stiffness, in particular an aluminium alloy and/or a carbon fibre composite material.

The indenter 20 and the first measuring mirror 38 are attached in particular to the first carrier plate part 27. The Lorentz actuators 23, 24 are fastened in particular to the second carrier plate part 28, in particular with the coils 26 or the magnet arrangements 25. The Lorentz actuators 23, 24 are in particular fastened to an upper side of the carrier plate 21 that is opposite the indenter 20. The Lorentz actuators 23, 24 and the indenter 20 are arranged on the opposite surfaces of the carrier plate 21.

The runner 19 is guided linearly without friction along the height direction 18, in particular by means of two precision shafts 29 through two air bearing bushes 30. The precision shafts 29 are each arranged on the carrier plate part 28, in particular on the upper side opposite the indenter 20, and fastened thereto. The precision shafts 29 are designed to be cylindrical or tubular. In addition, a precision shaft stop 32 is arranged at the upper end of the precision shaft 29 facing away from the carrier plate 21. At their respective axial ends, the precision shafts each have a precision shaft damping ring 31. The precision shaft damping rings 31 are designed in particular as O-rings and together with the carrier plate part 28 and the precision shaft stop 32 opposite the two air bearing bushes 30 serve as a mechanical stop for an upper and lower position of the runner 19. The precision shafts 29 are spaced apart from each other with respect to the indenter longitudinal axis 22 and in particular are arranged diametrically opposite each other on the carrier plate 21. The precision shafts 29 are spaced apart from each other with respect to the indenter longitudinal axis 22 and in particular are arranged diametrically opposite each other on the carrier plate 21.

The measuring system 1 has a displacement measuring unit 33. The displacement measuring unit 33 is designed as a laser interferometer and is shown schematically in the figures. The laser interferometer comprises a laser beam source 34, in particular an optical waveguide end, for emitting a laser beam 35. From the laser beam source 34, the laser beam 35 passes into a collimator 36 and from there into a beam splitter 37. The laser beam 35 is split at the beam splitter 37 and directed downwards to a first measuring mirror 38, reflected there and guided back into the beam splitter 37, passed straight through by the latter and reflected at a second measuring mirror 40 and guided back into the beam splitter 37. The laser beam is reflected by the beam splitter 37 and guided from there into the laser interferometer evaluation unit 39. The beam path from the beam splitter describes the measuring arm of the interferometer, which passes through the distance between the first measuring mirror 38 and the second measuring mirror 40 twice in total. Another part of the laser beam 35 coming from the collimator 36 is passed straight through in the beam splitter 37 and from there directly into a laser interferometer evaluation unit 39. This beam path describes the so-called reference arm of the interferometer. Since this beam path does not have a separately traversed length, the reference arm length is equal to zero. The laser interferometer evaluation unit 39 detects the changes in the optical length difference of the measuring arm and the reference arm, in particular for the measuring system 1 the change in the distance between the first measuring mirror 38 and the second measuring mirror 40. The laser beam 35 between the first measuring mirror 38 and the second measuring mirror 40, and in particular the measuring arm of the interferometer, is aligned with the indenter longitudinal axis 22, thus avoiding first-order length measurement deviations according to the Abbe principle.

The first measuring mirror 38 is a component of the runner 19 and is fastened in particular to the upper side of the first carrier plate part 27. The position of the first measuring mirror 38 is designed to be movable due to the positionability of the carrier plate 21, in particular along the height direction 18.

The position of the second measuring mirror 40 is designed to be stationary and is fastened in particular to the metrology frame 12, in particular to the upper holding plate 14. The two measuring mirrors 38, 40 are oriented in particular in alignment with each other and in particular in each case coaxially with the beam path of the laser beam 35 emitted by the beam splitter 37. In particular, the two measuring mirrors 38, 40 are each oriented coaxially to the indenter longitudinal axis 22.

A stationary reference position sensor 41 is arranged on the metrology frame 12, in particular on the holding plate 14, which stationary reference position sensor 41 comprises in particular a light source not shown in more detail, in particular an LED element, and a double photodiode. The stationary reference position sensor 41 interacts with the upper section and a horizontal slit of a slit diaphragm 42 incorporated therein to determine a reference position for initialising the incrementally measuring laser interferometer for dead-range dependent environmental correction. The slit diaphragm 42 is fastened in particular to the runner 19 and in particular to the carrier plate 21. A reference position sensor 43 movable in the height direction 18 is attached to the stand carriage 17. The movable reference position sensor 43 can be moved with the stand carriage 17 and is designed in particular identically to the stationary reference position sensor 41. The movable reference position sensor 43 interacts with the middle section and a further horizontal slit of the slit diaphragm 42 incorporated therein. The movable reference position sensor 43 serves to detect a reference position for the movement of the runner 19 as well as its control during the vertical pre-positioning of the stand carriage 17 with the indenter 20.

In particular, the measuring system 1 has two deflection measuring systems. Each deflection measuring system comprises a laser diode 44 whose emitted laser beam 50 passes through the indentation point 9. The laser beams 50 of the deflection measuring systems intersect at the indentation point 9 and can thus be used to visually evaluate the pre-positioning of the stand carriage 17 and/or to mark the indentation position. The deflection measuring systems each further comprise a position sensor 45, in particular a position-sensitive photodiode for detecting the laser beam 50 emitted by the laser diode 44 and reflected at the surface of the object 2. The position sensor 45 is designed, for example, as a quadrant photodiode or a lateral effect diode. The deflection measuring systems can be used to detect the distance of the stand carriage 17 from the object 2 and the inclination of the object 2.

In particular, the measuring system 1 can thereby perform an automatic adaptation to different thicknesses of the object 2 with an actuator for the vertical prepositioning of the stand carriage 17, which is not shown in more detail. By means of the detected inclination of the object 2, the inclination of the object 2 can be aligned with the indenter longitudinal axis 22 using the linear actuators 11.

The measuring system 1 has a control/regulation unit 46 which is in signal connection, in particular bidirectional, with all sensors and/or actuators of the measuring system 1. The control/regulation unit 46 can be integrated at any location in the measuring system or arranged externally thereto. The signal connection between the control/regulation unit 46 and the other components can be wired or wireless. By means of the control/regulation unit 46, a position and trajectory regulation of the indenter 20 is possible in real time.

The metrology frame 12 and the displacement measuring unit 33 define a separate displacement measuring circuit 47, which is symbolised by a dotted line in FIG. 1. The entire displacement measuring circuit 47 extends from the counter bearing 6 through the metrology frame 12, i.e. through the base 13, the support 15, the holding plate 14 and via the displacement measuring unit 33, i.e. the laser interferometer, the carrier plate 21 and the indenter 20 back via the object 2 to the counter bearing 6.

The indenter 20, the carrier plate 21, the at least one actuator 23 for force generation and the at least one actuator 24 for motion generation, the stand carriage 17, the vertical column 5, the base plate 4, the primary abutment 7 of the kinematic Kelvin coupling, the counter bearing 6 back via the object 2 to the indenter 20 define a force measuring circuit 48, which is shown in FIG. 1 with a dashed line.

The force measuring circuit 48 and the displacement measuring circuit 47 are largely separate from each other.

In the following, a method for primary and instrumented hardness measurement of the object 2 is explained in more detail with reference to FIGS. 1 to 3. First, the measuring system 1 is operated in a velocity mode and the runner 19 is moved at a defined velocity $v_{VM}$ with the at least one motion generation actuator 23, 24 and the induced voltage $U_{VM}$ is measured at the at least one force generation actuator 23, 24. Subsequently, the measuring system 1 is operated in a weighing mode and the coil current $I_{FM}$ or the voltage $U_{FM}$ dropping across the series resistor R required for compensating the weight or downhill slope force in the weighing mode is measured. It is thus possible to determine the weight force $F_G$ of the runner 19 according to equation (4) or, in the case of an arrangement inclined with respect to the vertical, the corresponding downhill slope force $F_{H,FM}$ according to equation (5).

In a final mode for hardness measurement, the indenter 20 penetrates the object 2 with a controlled/regulated linear movement of the runner 19, while simultaneously measuring the penetration distance $s_{M,HM}$ until the selected maximum measuring force $F_{M,HM}$ or the maximum penetration distance $s_{M,HM}$ is reached.

The method enables primary, instrumented hardness measurement with direct traceability via primary force and displacement measurement.

What is claimed is:

1. A measuring system for hardness measurement of an object, the measuring system comprising:
   a stand having
      a base plate and a vertical column fastened thereto,
      a stand carriage movable along the vertical column, and
      a counter bearing for placing the object;
   a runner fastened to the stand carriage and displaceable relative thereto in a guided manner, the runner having
      an indenter to penetrate the object,
      at least one force generation actuator, and
      at least one motion generation actuator,
      wherein the indenter is coupled to the stand carriage via the actuators, and wherein the indenter, the at least one force generation actuator, the stand carriage, the base plate, the vertical column, the counter bearing, and the object define a force measuring circuit;
   a metrology frame that rests on the base plate and is supported laterally on the vertical column; and
   a displacement measuring unit for measuring a displacement of the stand carriage or of the runner,
   wherein the metrology frame, the displacement measuring unit, the runner, the indenter, the object, and the counter bearing define a displacement measuring circuit, and
   wherein the force measuring circuit and the displacement measuring circuit are configured separately from one another.

2. The measuring system according to claim 1, comprising four actuators arranged diametrically opposite of each other in pairs, wherein one actuator of the four actuators is the at least one force generation actuator, and wherein another actuator of the four actuators is the at least one motion generation actuator.

3. The measuring system according to claim 2, wherein the four actuators are arranged diametrically opposite each other in pairs with respect to an indenter longitudinal axis.

4. The measuring system according to claim 1, wherein the at least one force generation actuator and the at least one motion generation actuator are fastened to a carrier plate of the runner.

5. The measuring system according to claim 4, wherein the indenter is held on the carrier plate.

6. The measuring system according to claim 4, wherein the carrier plate is designed in two parts with a first, thermally low-expansion carrier plate part, and a second carrier plate part.

7. The measuring system according to claim 6, wherein the thermally low-expansion carrier plate part is centrally arranged.

8. The measuring system according to claim 6, wherein the indenter and a first measuring mirror are fastened to the thermally low-expansion carrier plate part.

9. The measuring system according to claim 6, wherein the second carrier plate part surrounds the first carrier plate part.

10. The measuring system according to claim 4, wherein the first carrier plate part connects the at least one force generation actuator and the at least one motion generation actuator to the indenter.

11. The measuring system according to claim 1, wherein the stand and the metrology frame are connected via a kinematic Kelvin coupling.

12. The measuring system according to claim 11, wherein the position of the metrology frame relative to the stand is predetermined by means of an abutment of the counter bearing and the metrology frame is supported on the stand.

13. The measuring system according to claim 12, wherein the metrology frame is supported laterally on the stand.

14. The measuring system according to claim 12, wherein the metrology frame is supported on the stand by means of two further abutments of the kinematic Kelvin coupling.

15. The measuring system according to claim 1, wherein the displacement measuring unit is designed as a laser interferometer.

16. The measuring system according to claim 15, wherein the displacement measuring unit has a laser beam source, a collimator, a beam splitter, a first measuring mirror, a second measuring mirror, and a laser interferometer evaluation unit.

17. The measuring system according to claim 1, comprising at least one air bearing for guided frictionless mounting of the indenter relative to the stand carriage.

18. The measuring system according to claim 1, wherein the at least one force generation actuator and the at least one motion generation actuator each have a magnet arrangement and a coil movable with respect thereto.

19. The measuring system according to claim 18, wherein the magnet arrangement is fastened to the stand carriage.

20. The measuring system according to claim 1, comprising a deflection measuring system for at least one of detecting the distance of the stand carriage to the object and detecting the inclination of the object, wherein the deflection measuring system comprises a laser diode and a position sensor.

21. The measuring system according to claim 1, comprising a positioning actuator for at least one of horizontal positioning and inclination alignment of the object on the counter bearing.

22. The measuring system according to claim 1, comprising a control/regulation unit configured to operate the measuring system in various operating modes.

23. The measuring system according to claim 22, wherein the control/regulation unit is configured to operate the measuring system in at least one of a weighing mode, a velocity mode, and a hardness measurement mode.

24. The measuring system according to claim 23, wherein the control/regulation unit is configured to operate the measuring system with controlled trajectory and test force.

25. A method for primary and instrumented hardness measurement of an object using a measuring system according to claim 1, comprising the steps of
   in a velocity mode, measuring an induced voltage UVM of the at least one force generation actuator moved at a defined velocity vVM;
   in a weighing mode, measuring a coil current IFM that is required for a Lorentz force FL,FM generated in one of the actuators to compensate for a weight force portion of the runner depending on an angle of inclination; and
   in a hardness measurement mode, penetrating the indenter into the object with a linear movement of the runner until the selected maximum measuring force FM,HM according to FM,HM=UVM/vVM·(IFM−IM,HM) or maximum penetration distance sM,HM is reached and thereby a primary test force measurement according to the Kibble balance principle takes place.

26. The method according to claim 25, wherein during the velocity mode a measurement of the calibration distance sVM takes place or during the penetration of the indenter a measurement of the penetration distance sM,HM takes place, and wherein the velocities vVM or VM,HM are determined from a distance sVM or sM,HM determined by means of the displacement measuring unit and a traced back time standard t according to vVM=dsVM/dt or VM,HM=dsM,HM/dt.

27. The method according to claim 26, wherein a primary displacement measurement is carried out with an interferometer or a traceability of the displacement measurement is carried out via a primary displacement measurement.

28. The method according to claim 25, comprising automatic switching between the weighing mode, the velocity mode, and the hardness measurement mode.

29. The method according to claim 25, comprising an automatic pre-positioning of the stand carriage or parallel alignment of the surface normals of the object at the indentation point to the indenter longitudinal axis, either the pre-positioning or the alignment by at least one of the deflection measuring system and the positioning actuator in connection with the counter bearing.

\* \* \* \* \*